US010145393B2

(12) United States Patent
Henck et al.

(10) Patent No.: US 10,145,393 B2
(45) Date of Patent: Dec. 4, 2018

(54) LINEAR ACTUATOR

(71) Applicant: TK Holdings Inc., Auburn Hills, MI (US)

(72) Inventors: Jeremy Henck, White Lake, MI (US); Steven Rehak, Shelby Township, MI (US); Larry Wilmot, Oxford, MI (US); Rachid Hammoud, Windsor (CA)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 231 days.

(21) Appl. No.: 15/185,984

(22) Filed: Jun. 17, 2016

(65) Prior Publication Data

US 2017/0363119 A1 Dec. 21, 2017

(51) Int. Cl.
  *F15B 15/14* (2006.01)
  *B60R 21/38* (2011.01)
  *E05F 1/00* (2006.01)

(52) U.S. Cl.
  CPC .......... *F15B 15/1419* (2013.01); *B60R 21/38* (2013.01); *E05F 1/00* (2013.01); *F15B 15/1428* (2013.01); *F15B 15/1438* (2013.01); *F15B 15/1447* (2013.01); *F15B 15/1457* (2013.01)

(58) Field of Classification Search
  CPC .......... B60R 21/00; B60R 21/38; B62D 25/10
  See application file for complete search history.

(56) References Cited

U.S. PATENT DOCUMENTS

| | | | | |
|---|---|---|---|---|
| 3,112,670 A | * | 12/1963 | Litz, Jr. | .................. F42B 3/006 60/636 |
| 4,860,698 A | * | 8/1989 | Patrichi | .................. F42B 3/006 123/24 R |
| 6,568,184 B2 | | 5/2003 | Blackburn et al. | |
| 6,966,249 B2 | | 11/2005 | Lee et al. | |
| 7,127,982 B2 | * | 10/2006 | Garcia | ................ F15B 15/1414 92/165 PR |

(Continued)

FOREIGN PATENT DOCUMENTS

| | | |
|---|---|---|
| CN | 201526553 U | 7/2010 |
| JP | H07269518 A | 10/1995 |

(Continued)

OTHER PUBLICATIONS

International Search Report, dated Aug. 29, 2017, in connection with International Application No. PCT/US2017/037958.

(Continued)

*Primary Examiner* — Thomas E Lazo
(74) *Attorney, Agent, or Firm* — Meunier Carlin & Curfman LLC

(57) ABSTRACT

A hood lifting mechanism according to various implementations includes a housing and a piston. A distal end of the piston is urged away from a distal end of the housing to lift a hood upwardly away from a vehicle body in response to the vehicle hitting a pedestrian. To prevent the piston from rattling or moving within the housing while in a stored position, a portion of the piston and a portion of the housing form an interference fit in the stored position. A gas generator in fluid communication with a proximal end of the housing provides sufficient force to overcome the interference fit and urge the distal end of the piston out of the housing.

18 Claims, 11 Drawing Sheets

(56) References Cited

U.S. PATENT DOCUMENTS

| | | | |
|---|---|---|---|
| 7,698,895 B2* | 4/2010 | Bretfeld | F15B 15/19 |
| | | | 60/632 |
| 7,862,282 B2 | 1/2011 | Smith et al. | |
| 8,596,180 B2* | 12/2013 | Schaefer | B60R 21/38 |
| | | | 180/274 |
| 2006/0196354 A1 | 9/2006 | Garcia et al. | |
| 2012/0204562 A1 | 8/2012 | Schafer et al. | |
| 2014/0157918 A1* | 6/2014 | Ikeda | F16H 25/2204 |
| | | | 74/89.23 |
| 2014/0339010 A1 | 11/2014 | Henck et al. | |
| 2014/0360350 A1 | 12/2014 | Wilmot et al. | |
| 2015/0075402 A1 | 3/2015 | Henck et al. | |
| 2015/0090111 A1 | 4/2015 | Henck et al. | |
| 2015/0226239 A1 | 8/2015 | Vanhooser et al. | |
| 2015/0307059 A1 | 10/2015 | Henck et al. | |
| 2015/0322977 A1 | 11/2015 | Scheer et al. | |
| 2016/0001736 A1 | 1/2016 | Abe et al. | |

FOREIGN PATENT DOCUMENTS

| | | |
|---|---|---|
| JP | 10141319 A | 5/1998 |
| JP | 2001173609 A | 6/2001 |
| KR | 10-2013-0025429 | 3/2013 |

OTHER PUBLICATIONS

Written Opinion of the International Searching Authority, dated Aug. 29, 2017, in connection with International Application No. PCT/US2017/037958.

* cited by examiner

LINEAR ACTUATOR

BACKGROUND

Hood lifting mechanisms include linear actuators that push the hood upward in the event of a collision with a pedestrian or imminent impact with a pedestrian. This upward movement creates space between the hood and the vehicle body and allows the hood to absorb the impact of the pedestrian, preventing the pedestrian's head or body from striking parts of the vehicle that are below the hood (e.g., the engine block).

The linear actuator includes a piston within a housing and a combustion chamber in fluid communication with the piston. Double backed adhesive tape is wrapped around at least one end of the piston to hold the piston in place within the housing to prevent the piston from rattling. The adhesive tape also holds the piston in place during expansion due to temperature changes in the combustion chamber. This expansion causes the piston to push on the environmental cap over time, creating a gap that exposes the actuator to environmental elements. However, the adhesive tape solution is expensive from a component standpoint and cumbersome for manufacturing.

Therefore, there is a need in the art for an improved linear actuator.

BRIEF SUMMARY

Various implementations include a hood lifting mechanism that comprises a housing defining at least one opening and a piston that is axially movable within the opening from a stored position to an extended position. The piston has an engagement area adjacent an outer surface of the piston. A mating surface of the opening of the housing faces the engagement area of the piston in the stored position, and the mating surface and the engagement area form an interference fit that prevents lateral, rotation, and axial movement of the piston in the stored position and allows the piston to move axially away from the mating surface to the extended position in response to the piston receiving a threshold actuating force.

In certain implementations, one of the engagement area or mating surface defines at least one rib that extends radially toward the other of the mating surface or the engagement area. In some implementations, the rib has the same radial height from a proximal end of the rib to a distal end of the rib. However, in other implementations, the radial height of the rib tapers from the distal end of the rib toward the proximal end of the rib. In some implementations, the rib has a triangular profile as taken in the axial direction. And, in some implementations, the rib comprises a plurality of ribs that are circumferentially spaced apart from each other.

In certain implementations, the engagement area and mating surface are non-circular shaped. For example, the engagement area and mating surface have rectangular shaped profiles as taken in the axial direction, according to some implementations.

In certain implementations, the piston comprises a proximal end and a distal end, and the engagement area is adjacent the distal end or the proximal end. In some implementations, the piston includes a first engagement area adjacent the distal end and a second engagement area adjacent the proximal end.

In certain implementations, the housing comprises an outer tube having a distal end. The mating surface includes at least a portion of a surface of an opening defined by the distal end of the outer tube. In some implementations, the distal end of the outer tube includes a wall that extends radially inwardly from an inner surface of the outer tube and defines the opening.

In some implementations, the housing comprises the outer tube and an end bracket disposed adjacent the distal end of the outer tube. The end bracket defines an opening that is axially aligned with the opening defined by the outer tube. In some implementations, the mating surface also includes at least a portion of a surface of the opening defined by the end bracket. In other implementations, the mating surface includes the surface of the opening defined by the end bracket or the surface of the opening defined by the outer tube.

In other implementations, the housing includes the outer tube and an end cap disposed adjacent the distal end of the outer tube. The end cap defines an opening that is axially aligned with the opening defined by the outer tube. In some implementations, the mating surface also includes at least a portion of a surface of the opening defined by the end cap. In other implementations, the mating surface includes the surface of the opening defined by the end cap or the surface of the opening defined by the outer tube.

In certain implementations, the piston includes a piston rod and a striker. The striker is coupled to a distal end of the piston rod, and at least a portion of an outer radial surface of the striker defines the engagement area. In some implementations, the striker is threadingly coupled to the distal end of the piston rod. In other implementations, the striker is integrally formed with the piston rod.

In certain implementations, the threshold actuating force is at least about 300 Newtons.

In addition, in some implementations, an outer diameter of the engagement area is greater than an inner diameter of the mating surface by between 0.05 mm and 0.4 mm.

BRIEF DESCRIPTION OF THE FIGURES

The device is explained in even greater detail in the following exemplary drawings. The drawings are merely exemplary to illustrate the structure of preferred devices and certain features that may be used singularly or in combination with other features. The invention should not be limited to the implementations shown.

DETAILED DESCRIPTION

A hood lifting mechanism according to various implementations includes a housing and a piston. A distal end of the piston is urged away from a distal end of the housing to lift a hood upwardly away from a vehicle body in response to the vehicle hitting a pedestrian or in response to an imminent impact with a pedestrian. To prevent the piston from rattling or moving within the housing while in a stored position, a portion of the piston and a portion of the housing form an interference fit in the stored position. A gas generator (e.g., an initiator or micro gas generator (MGG)) in fluid communication with a proximal end of the housing provides sufficient force (e.g., at least 300 Newtons) to overcome the interference fit and urge the distal end of the piston out of the housing.

Figure 1A:
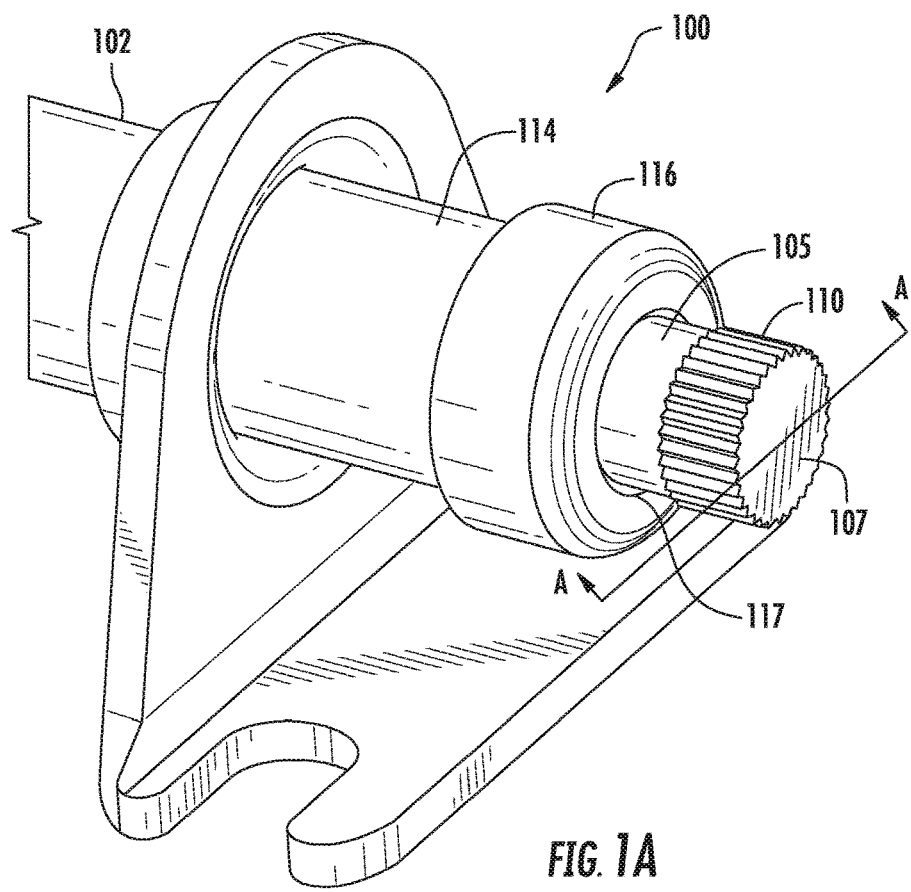
FIG. 1A illustrates a perspective view of a housing with a piston in a partially extended position, according to one implementation.
Figure 1B:
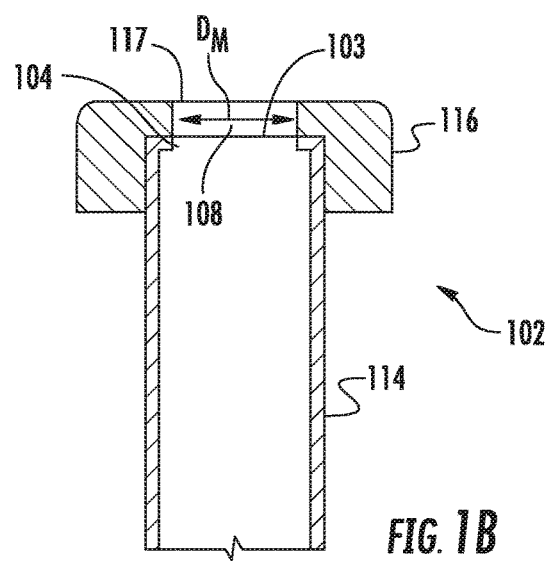
FIG. 1B illustrates a cross sectional view of the housing shown in FIG. 1A as viewed along the A-A line.
Figure 1C:
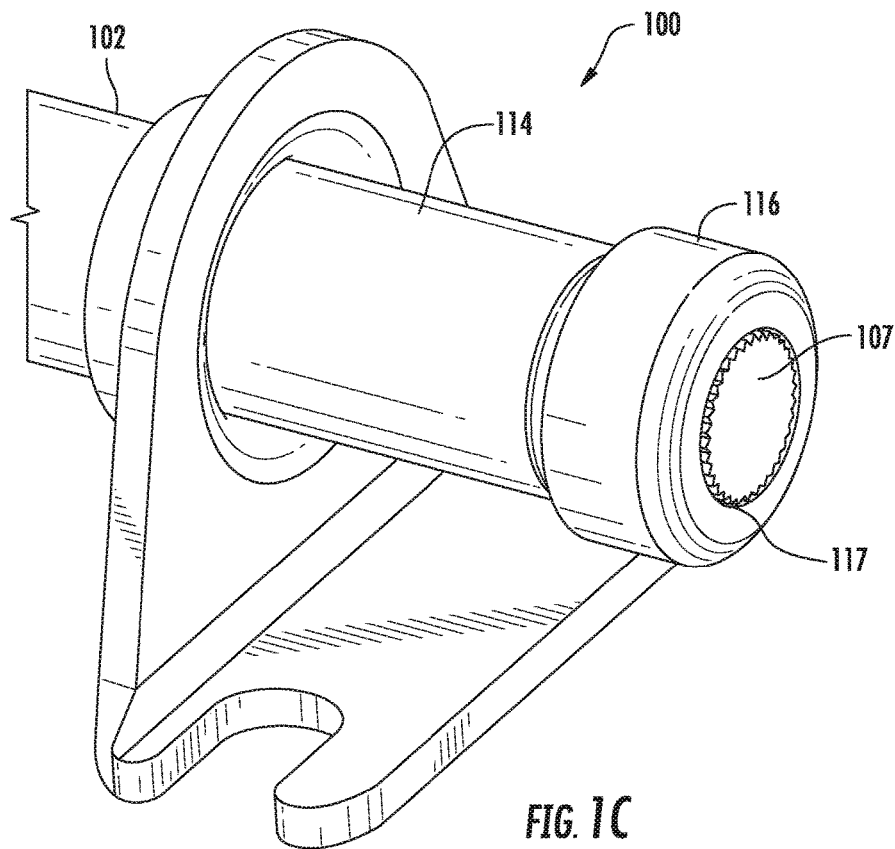
FIG. 1C illustrates a perspective view of the housing in FIG. 1A with the piston in a stored position.

As shown in FIGS. 1A-1C and 2A, the hood lifting mechanism 100 includes a housing 102 that includes a tube 114 and an end cap 116. The tube 114 has a distal end 104 that defines an opening 103. The distal end 104 extends radially inwardly such that the inner diameter of the opening 103 is less than an inner diameter of the outer tube 114. The end cap 116 is disposed around the distal end 104 of the tube 114 and defines an opening 117 that axially aligns with the opening 103 of the tube 114. A proximal end of the tube 114 is in fluid communication with a gas generator. The piston 105 is axially moveable within the opening 103 of the tube 114 and the opening 117 of the end cap 116 from a stored position to an extended position. FIG. 1A shows the piston 105 in a partially extended position, and FIG. 1C shows the piston 105 in a stored position. A distal end 107 of the piston 105 is disposed adjacent the distal end 104 of the tube 114 in the stored position, and in the extended position, the distal end 107 of the piston 105 is outside of and spaced apart from the openings 103, 117.

Figure 2A:
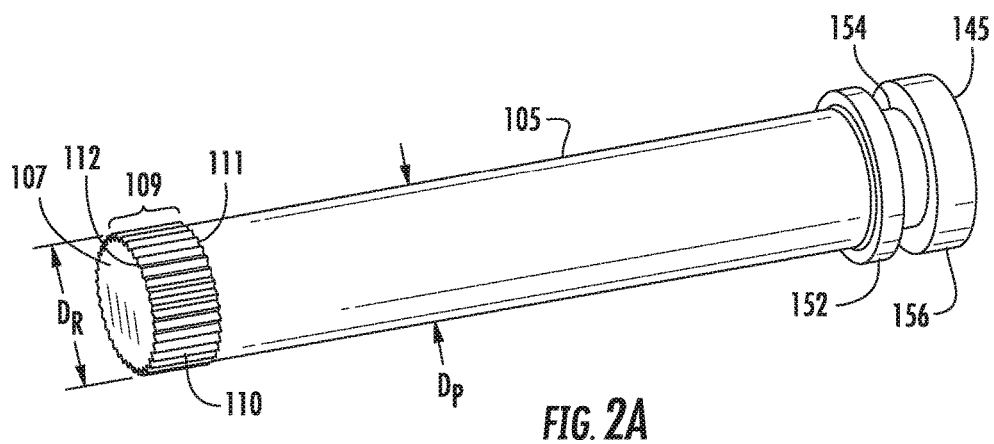
FIG. 2A illustrates the piston in FIG. 1A outside of the housing.

The housing 102 defines a mating surface 108 on at least a portion of an inner surface of the openings 117 and 103, as shown in FIG. 1B, and the piston 105 defines an engagement area 109 around at least a portion of the outer surface of the piston 105, as shown in FIG. 2A. For example, in the implementation shown in FIGS. 1A-1C, the engagement area 109 is defined around the outer surface of the piston 105 just below the distal end 107 of the piston 105. In the stored position, the mating surface 108 and engagement area 109 face each other and form an interference fit to prevent lateral, rotational, and axial movement of the piston 105. However, the interference fit is overcome in response to the piston 105 receiving a threshold actuating force from the gas generator, such as at least 300 Newtons, which allows the distal end 107 of the piston 105 to move axially away from the openings 103, 117 and into the extended position. In other implementations, the mating surface 108 may include at least a portion of one of the inner surface of the opening 103 adjacent the distal end 104 of the tube 114 or the inner surface of the opening 117 of the end cap 116.

Figure 2B:
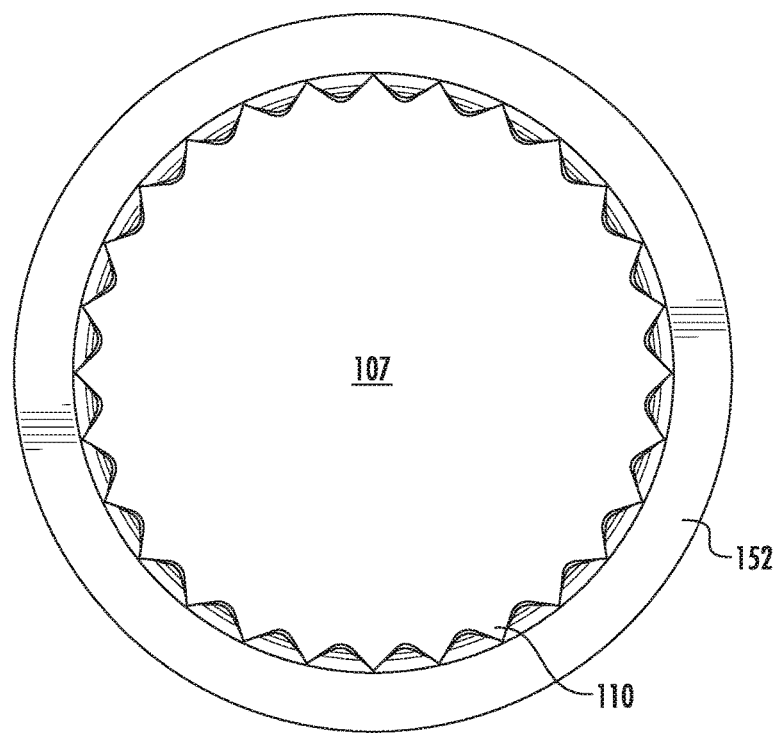
FIG. 2B illustrates a distal end view of the piston in FIG. 2A.

As shown in FIG. 2A, the engagement area 109 includes a plurality of ribs 110 (or splines) that extend radially outwardly from and axially along the outer surface of the piston 105. In addition, the ribs are circumferentially spaced apart from each other. The ribs 110 have triangular shaped profiles as viewed in the axial direction, which can be seen in FIG. 2B. An outer diameter $D_R$ of the piston 105 around the ribs 110 is greater than an outer diameter $D_P$ of the piston 105 where the ribs 110 are not defined. As shown in FIG. 1B, the inner diameter $D_M$ of the openings 117, 103 at the mating surface 108 is slightly smaller than the outer diameter $D_R$, which allows for an interference fit in the stored position. In some implementations, the difference between the outer diameter $D_R$ of the piston 105 around the ribs 110 and the inner diameter $D_M$ of the mating surface 108 ($D_R$-$D_M$) is based on the threshold actuating force expected for overcoming the interference fit and translating the piston 105 from the stored position to the extended position. For example, in one implementation in which the threshold actuating force is expected to be 300 Newtons, the difference between $D_R$ and $D_M$ is 0.3 mm. In other implementations, the difference between $D_R$ and $D_M$ is between 0.05 mm and 0.4 mm. A larger difference between the outer diameter $D_R$ of the piston 105 around the ribs 110 and the inner diameter $D_M$ of the mating surface 108 ($D_R$-$D_M$) results in more force being required to overcome the interference fit and translate the piston into the extended position, according to some implementations.

Each rib 110 has the same radial height from a proximal end 111 of the rib 110 to a distal end 112 of the rib 110 (or along an axial length of the rib 110). In addition, as shown in FIG. 2A, a first annular ring 152 and a second annular ring 156 extend radially outwardly from the piston 105 adjacent a proximal end 145 of the piston 105 and are axially spaced apart from each other to define an annular groove 154 between them. An o-ring may be disposed within the annular groove 154 to seal the combustion chamber (not shown) and allow more efficient actuation of the piston 105. Other implementations may include ribs having other shapes, such as trapezoidal, rectangular, arcuate, or another suitable shape.

Figure 3:
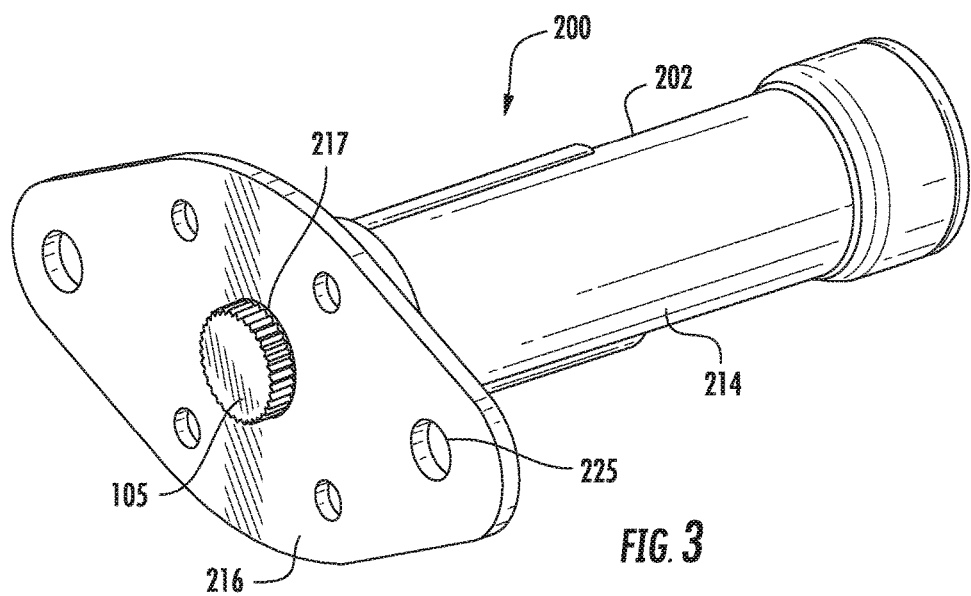
FIG. 3 illustrates a perspective view of a housing with an end bracket and the piston in FIG. 2A in a partially extended position, according to one implementation.

FIG. 3 illustrates another implementation of a housing 200 that includes a tube 214 and an end bracket 216. The tube 214 is similar to tube 114 described in relation to FIGS. 1A and 1B. The bracket 216 defines an opening 217 that is axially aligned with the opening defined at the distal end of the tube 214. The bracket 216 may define additional openings 225 through which fasteners, such as screws or bolts, are insertable for coupling the bracket 216 to another surface of the vehicle.

In various implementations, a wall at the distal end 104 of the outer tube 114 extends radially inwardly from the inner surface of the outer tube 114 in a plane that is substantially perpendicular to the central axis of the tube 114, and wall at the distal end 104 is formed when the tube 114 is made initially. However, in other implementations (not shown), the distal end 104 may be crimped or roll formed after the tube 114 is initially formed to reduce the diameter of the distal end 104.

Figure 4A:
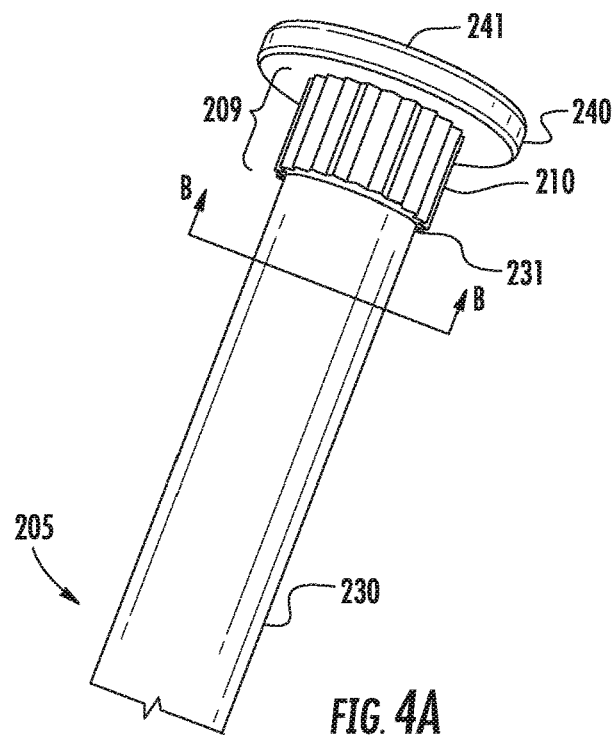
FIG. 4A illustrates a piston rod and a striker that is threadingly coupled to a distal end of the piston rod, according to various implementations.
Figure 4B:
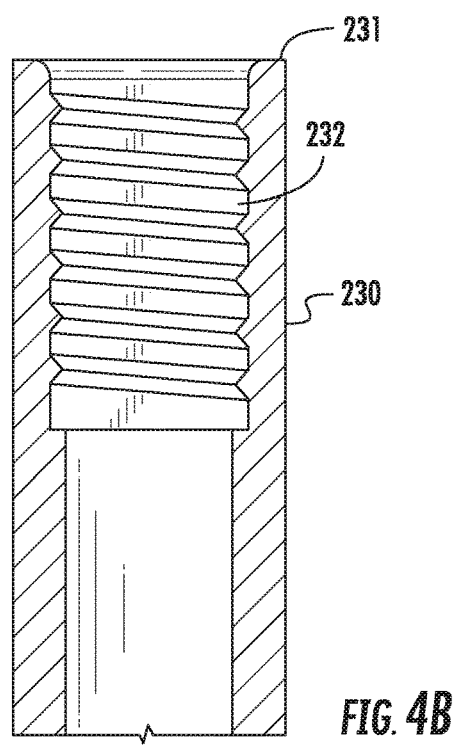
FIG. 4B illustrates a cross sectional view of the piston rod of FIG. 4A as viewed along the B-B line in FIG. 4A.

In the implementation of the piston 105 shown in FIGS. 1A-1C, 2A-2B, and 3, the distal end 107 of the piston 105 defines a striker surface that is in contact with the hood during deployment of the piston 105 into its extended position, and the engagement area 109 is integrally formed on the piston 105. However, in the implementation shown in FIGS. 4A and 5A, the piston 205 includes a separately formed piston rod 230 and striker 240 that defines the engagement area 209. The striker 240 includes a head 241 at a distal end of the striker 240 and a threaded area 242 around the striker 240 adjacent a proximal end thereof. The engagement area 209 is defined between the threaded area 242 and the head 241. The head 241 has an outer diameter that is greater than the inner diameter of the opening of the tube of the housing and is disposed outside of the opening of the tube in the stored position. The piston rod 230 defines a threaded, axial opening 232 at a distal end 231 of the piston rod 230, and the threaded area 242 of the striker 240 is threadingly engaged in the opening 232 of the piston rod 230 to couple the piston rod 230 and the striker 240.

Figure 5A:
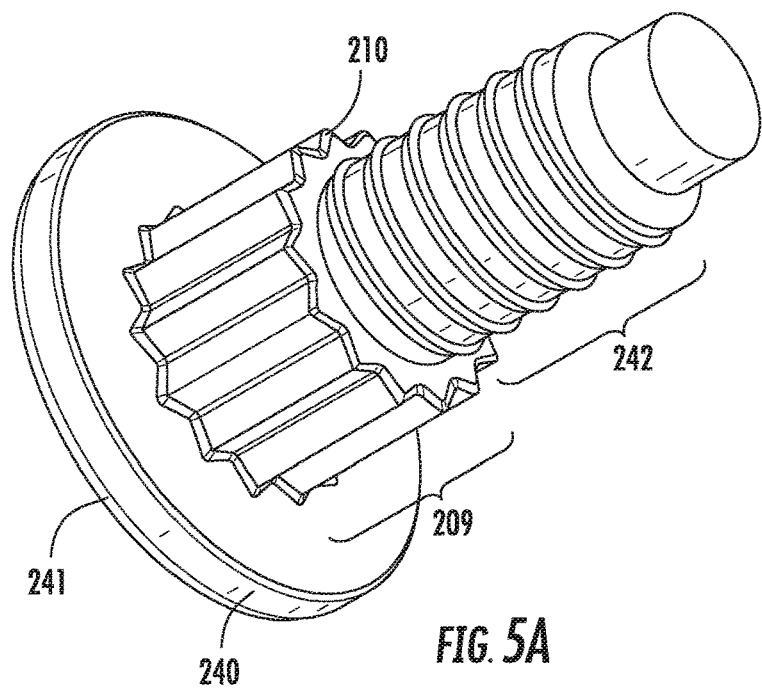
FIG. 5A illustrates a perspective view of the striker shown in FIG. 4A.
Figure 5B:
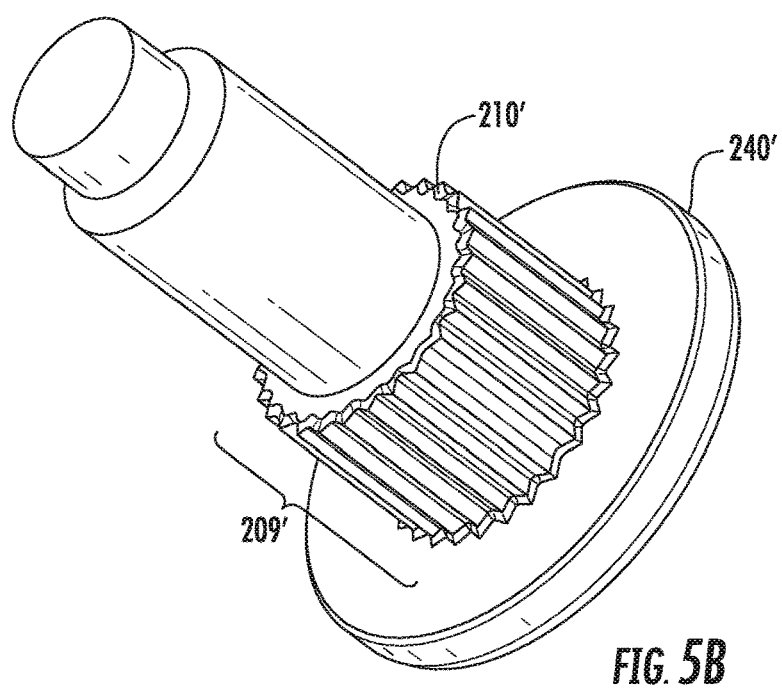
FIG. 5B illustrates a perspective view of a striker according to another implementation.

As shown in FIGS. 5A and 5B, the cross-sectional shape of the engagement area of the striker can vary. For example, the engagement area 209 of striker 240 shown in FIG. 5A has a plurality of triangular shaped ribs 210 (as viewed from the axial direction) that are circumferentially spaced apart and extend radially outwardly and axially along the striker's outer surface. The engagement area 209' of striker 240' shown in FIG. 5B includes more triangular shaped ribs 210' than striker 240, and the ribs 210' do not extend radially outwardly as far as the ribs 210 of striker 240. In addition, the engagement area of various strikers may have the same number of ribs or ribs having the same dimensions, but the outer diameter of the striker around the ribs may differ. And, the outer diameter of the threaded area 242 may differ among strikers based on the opening size defined in the piston rod to which the striker is intended to be coupled.

Figure 6:
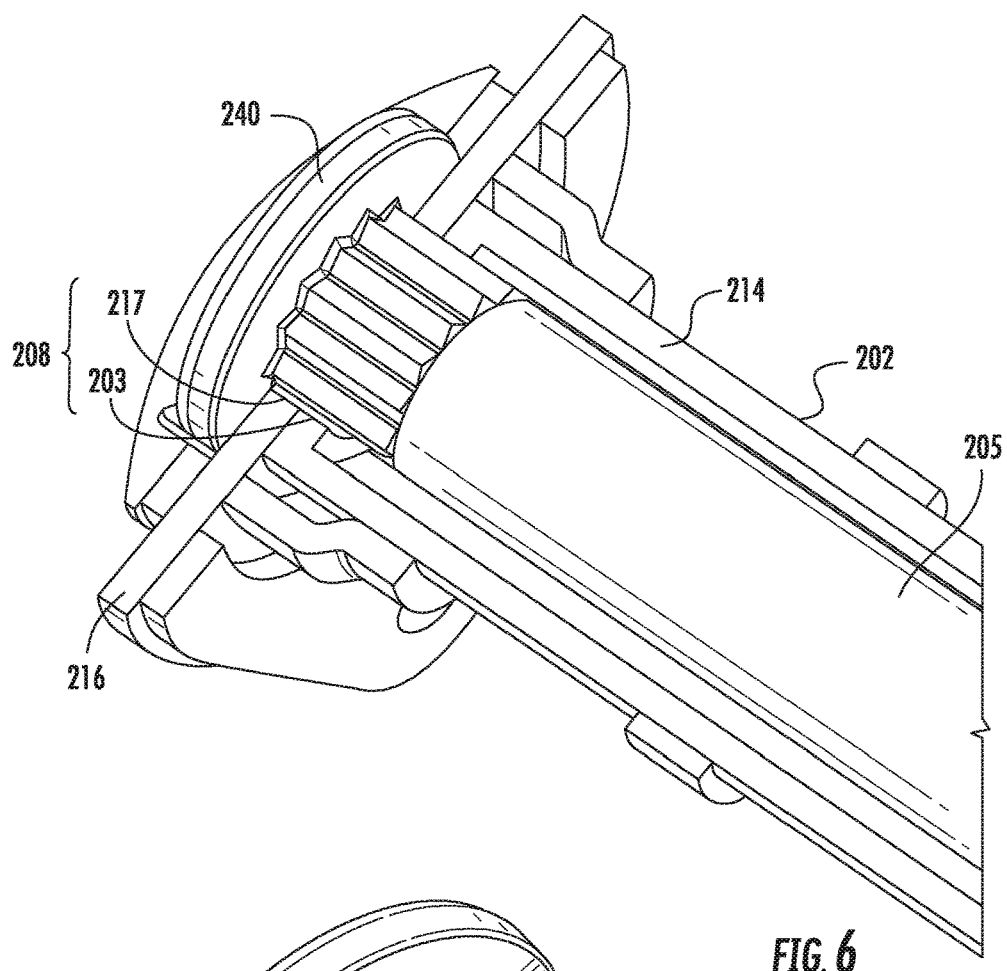
FIG. 6 illustrates a partial cross sectional perspective view of the piston rod and striker shown in FIG. 4A within the housing shown in FIG. 3, according to one implementation.
Figure 7:
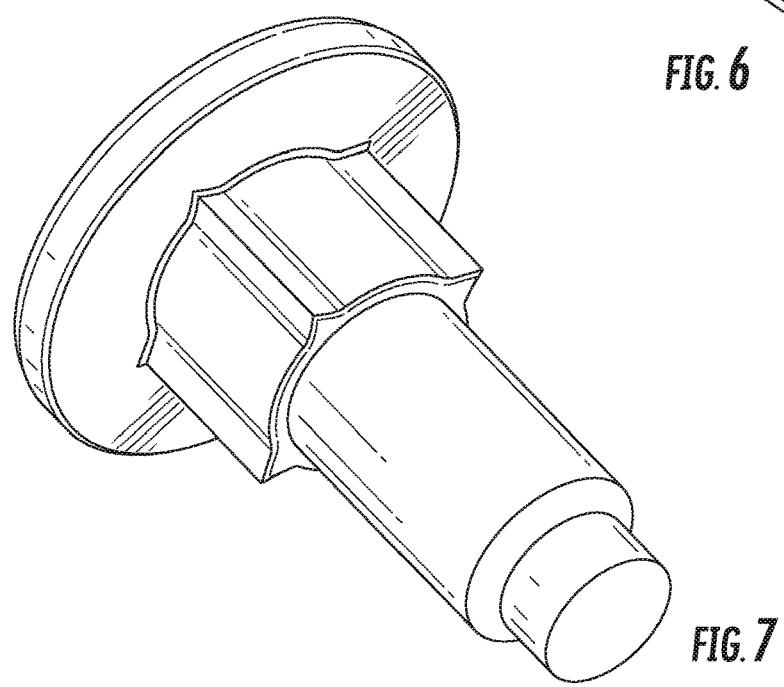
FIGS. 7 through 11 illustrate perspective views of strikers having various spline designs, according to various implementations.

FIG. 6 illustrates a partial cross sectional view of piston 205 within housing 202 having end bracket 216. Engagement area 209 of the striker 240 faces and engages with mating surface 208, which includes adjacent openings 203, 217.

Figure 8:
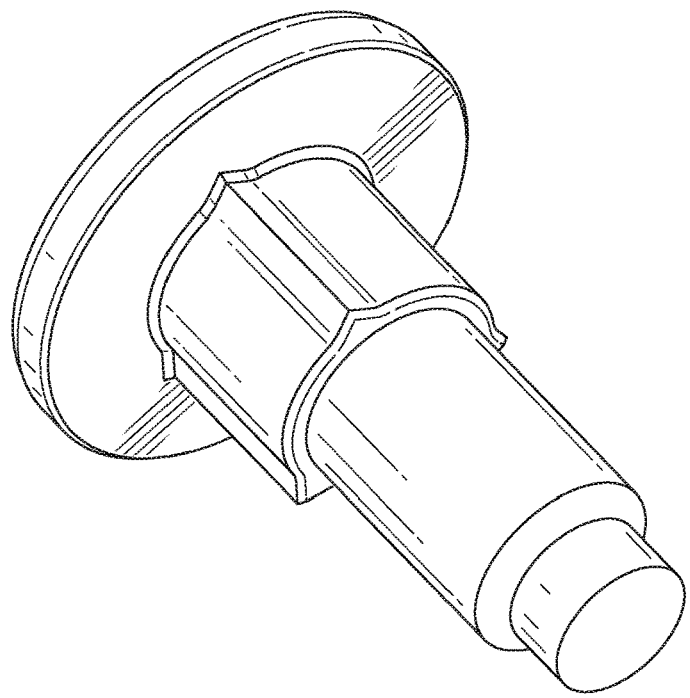

FIGS. 7-12 illustrate other implementations of striker engagement areas. For example, in FIG. 7, the engagement area includes four triangular shaped ribs that extend radially outwardly and axially along the engagement area and are circumferentially spaced apart. The ribs are equally spaced apart around the outer surface of the striker. FIG. 8 illustrates an engagement area that includes three triangular shaped ribs that extend radially outwardly and axially along the engagement area and are circumferentially spaced apart. The ribs are equally spaced apart around the outer surface of the striker.

Figure 9:
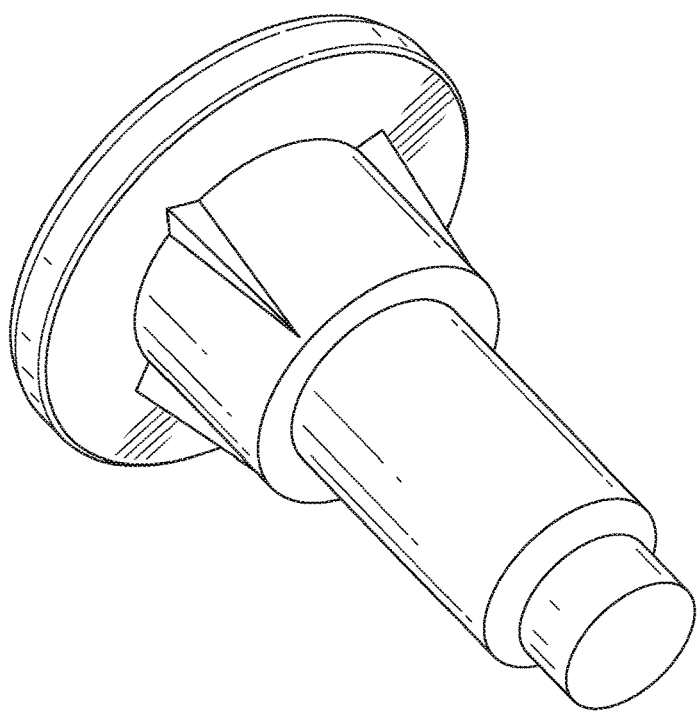

The ribs shown thus far have had a constant radial height along the axial length of each rib (from each rib's distal end to the proximal end), but the radial height of the ribs may taper radially inwardly, as is shown in FIG. 9. In particular, FIG. 9 illustrates an engagement area having four ribs that extend radially outwardly and axially along the engagement area and are circumferentially spaced equi-distance apart, and a radial height of each rib tapers, or decreases, from a distal end of the rib to the proximal end of the rib.

Figure 10:
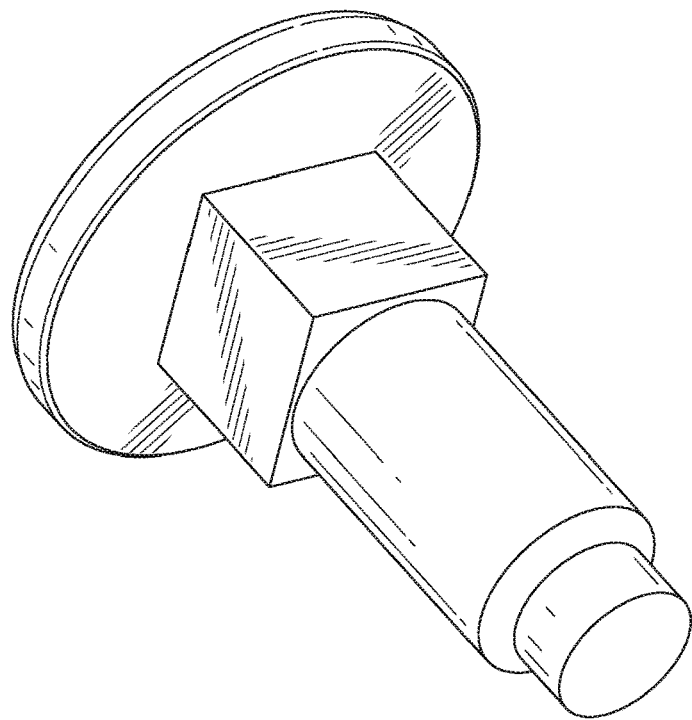
Figure 11:
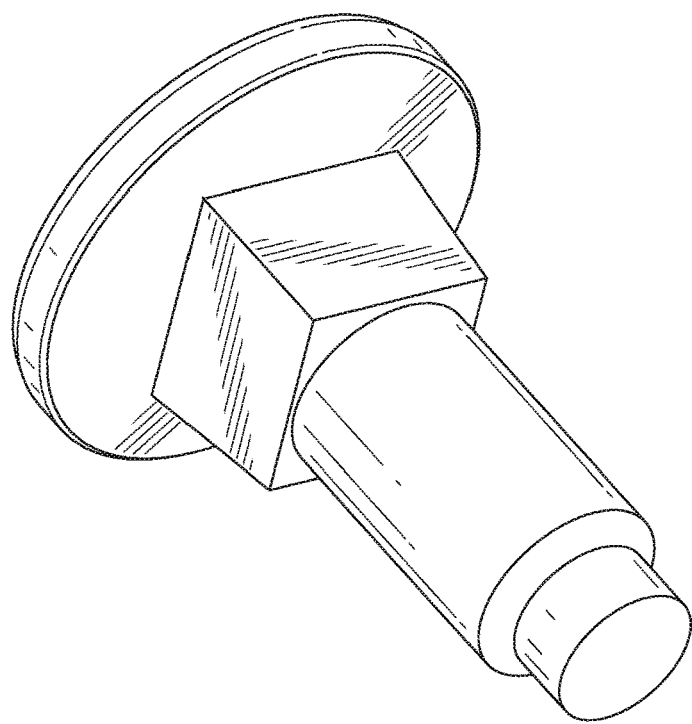

The engagement areas shown in FIGS. 1A, 1C, 2, 3, 4A, 5A, 5B, and 6-9 include ribs, but other implementations may include any non-circular shaped engagement area. For example, FIG. 10 illustrates a cube shaped engagement area, and FIG. 11 illustrates a truncated right pyramid shaped engagement area, wherein the radial outer perimeter of the engagement area decreases in the axial direction from the distal end to the proximal end of the engagement area.

Figure 12:
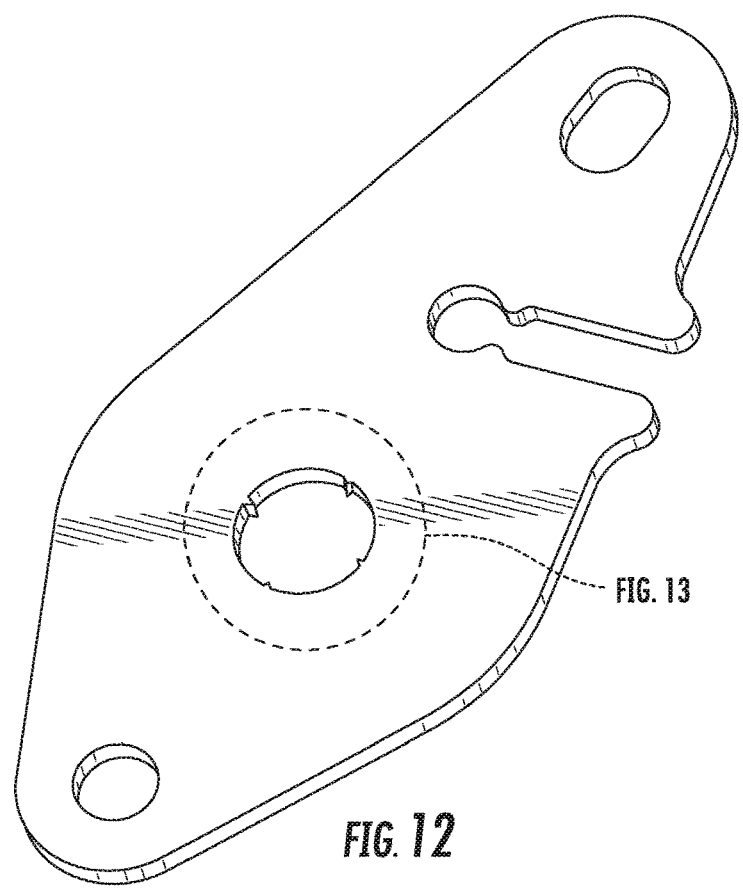
FIG. 12 illustrates a perspective view of a housing bracket having a piston opening that includes ribs that extend radially inwardly of the piston opening, according to one implementation.
Figure 13:
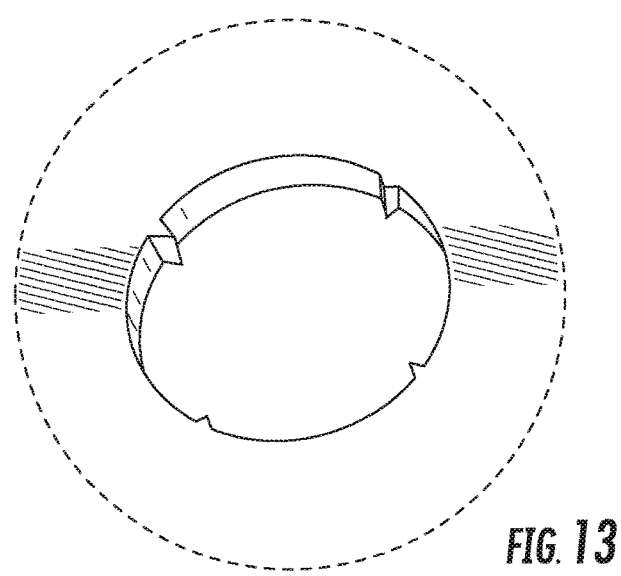
FIG. 13 illustrates a partial perspective view of the piston opening shown in FIG. 12.

The mating surface 108, 208 of the housing 102, 202 may be substantially circular, as shown in the implementations in FIGS. 1A-1C, 3, 4, and 7 or it may have a non-circular cross sectional shape. For example, the cross sectional shape of the mating surface may be rectangular to mate with the cube-shaped engagement area shown in FIG. 10 or FIG. 11, or the mating surface may define grooves into which ribs fit when the piston is in the stored position. Alternatively, the mating surface may define ribs that extend radially inwardly, as shown in FIGS. 12 and 13. In one such implementation, the engagement area of the piston may be smooth.

Furthermore, in some implementations, the engagement area is defined at another location along a length of the piston, such as adjacent the proximal end of the piston or between the proximal end and the distal end. And, in some implementations, the piston may include more than one engagement area. For example, in the implementations shown in FIGS. 15 and 16, the piston rod 305 includes a first engagement area 309 defined adjacent the distal end and a second engagement area 350 defined axially adjacent a first annular ring 352 that in part defines the annular o-ring groove 354. This second engagement area 350 includes a plurality of ribs 351 extending radially outwardly from and axially along the portion of the piston rod 305 adjacent the first annular ring 352, and the ribs 351 are circumferentially spaced apart from each other.

Figure 15:
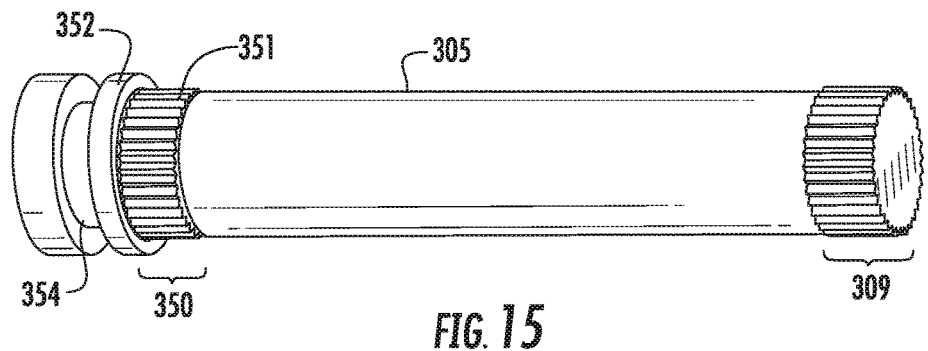
FIG. 15 illustrates a perspective view of a piston rod according to another implementation.
Figure 16:
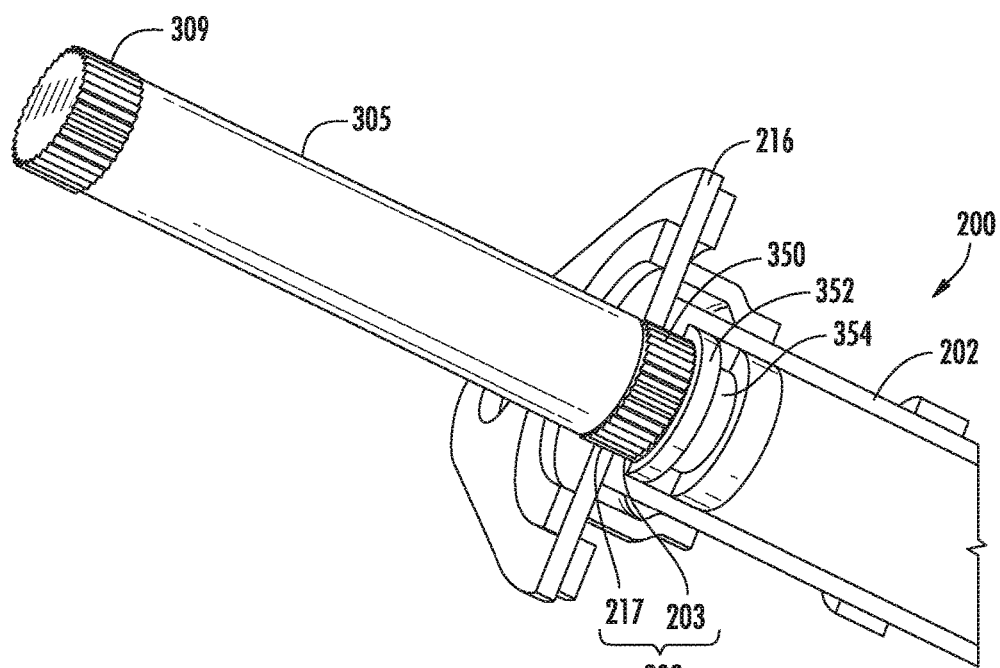
FIG. 16 illustrates a partial perspective view of the piston rod shown in FIG. 15 extending from the housing shown in FIG. 3.

FIG. 16 illustrates the piston rod 305 shown in FIG. 15 in the extended (or deployed) position relative to housing 200 described above in relation to FIGS. 3 and 6. The second engagement area 350 absorbs at least a portion of the energy of the piston 305 during a dry fire test and causes the proximal end of the piston 305 to remain in the housing 200. A dry fire test includes deploying the actuator without a load on the distal end of the piston and is performed to simulate an accidental ignition during transport of the hood lifting mechanism. In particular, during a dry fire test (or accidental deployment during transport), the first engagement area 309 moves past the mating surface 208 of the housing 200, and the ribs 351 of the second engagement area 350 engage the mating surface 208 of the housing 200 and absorb at least a portion of the energy released in the dry fire test.

In various implementations, the gas generator is selected from an initiator or a micro gas generator (MGG). However, in other implementations, any suitable type of gas generator may be selected.

Figure 14A:
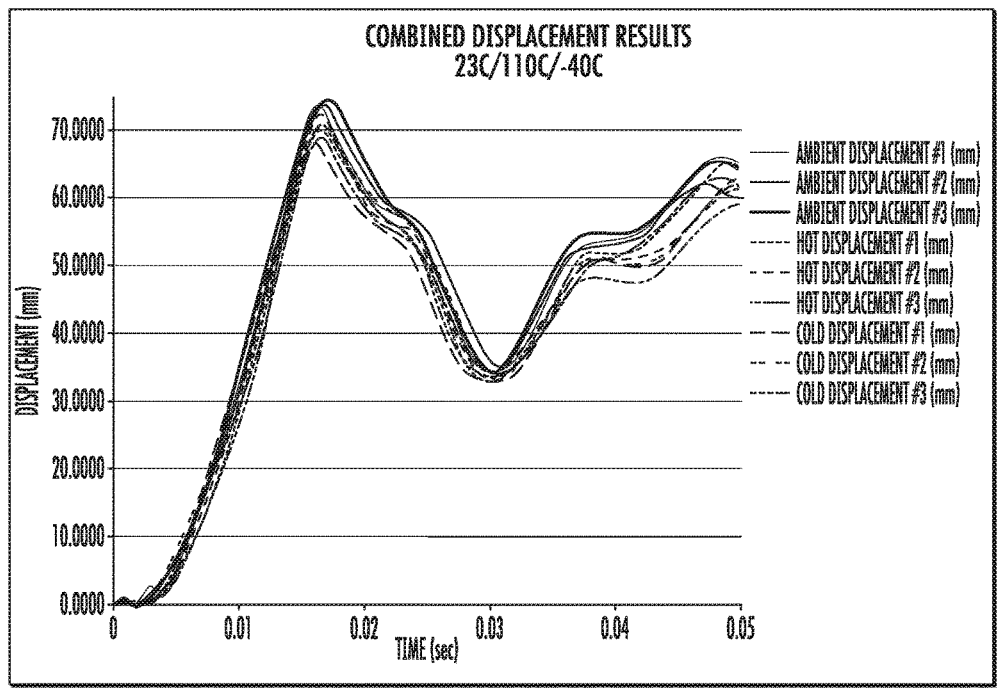
FIG. 14A illustrates data showing the displacement versus time of a piston according to various implementations being deployed at various temperatures.
Figure 14B:
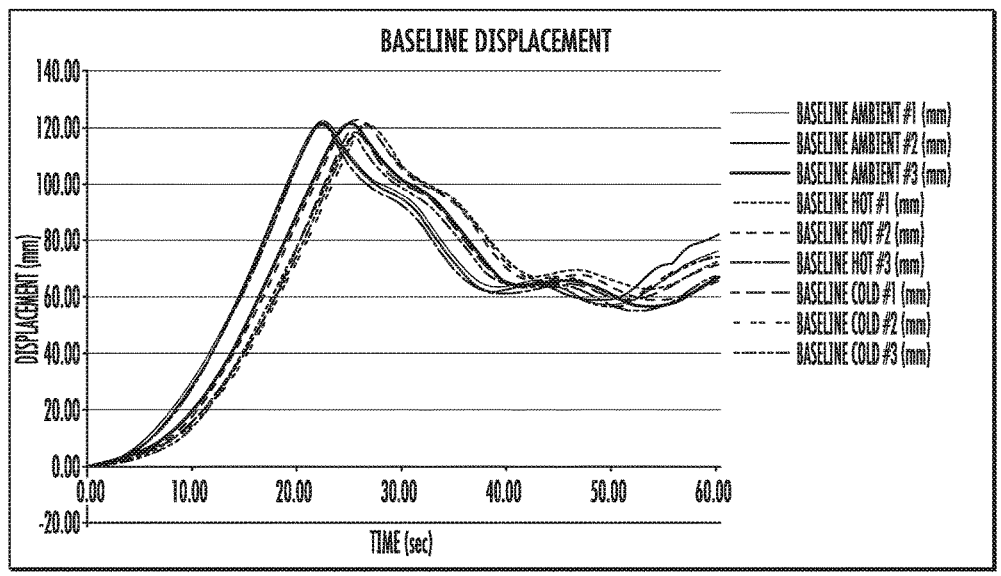
FIG. 14B illustrates data showing the displacement versus time of a prior art piston being deployed at various temperatures.

The interference fit between the piston and the housing prevents the piston from moving from the stored position or rattling while in the stored position. In addition, the time at which the piston moves into the extended position after application of the actuating force (response time) is substantially the same over a wide range of temperature conditions for hood lifting mechanisms having the interference fit. However, the response time of prior art pistons varies depending on the ambient temperature at which the deployment occurs. The temperature ranges are typically between 110° C. and −40° C. FIG. 14A illustrates timing data of the movement of pistons according to various implementations at various temperatures. As shown, the timing of the pistons' movement at 23° C., 110° C., and −40° C. is substantially the same (e.g., around 0.02 seconds or less as shown in FIG. 14A). However, as shown in FIG. 14B, the timing of the movement of prior art pistons without an interference fit varies at various temperatures.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A hood lifting mechanism comprising:
a housing comprising an outer tube having a distal end, the distal end of the outer tube defining at least one opening; and
a piston axially movable within the opening from a stored position to an extended position, the piston having an engagement area adjacent an outer surface of the piston;
wherein at least a portion of a surface of the opening that is adjacent the distal end of the outer tube comprises a mating surface, the mating surface faces the engagement area of the piston in the stored position, the mating surface and the engagement area forming an interference fit that prevents lateral, rotation, and axial movement of the piston in the stored position and allows the piston to move axially away from the mating surface to the extended position in response to the piston receiving a threshold actuating force.

2. The hood lifting mechanism of claim 1, wherein one of the engagement area or mating surface defines at least one rib that extends radially toward the other of the mating surface or the engagement area.

3. The hood lifting mechanism of claim 2, wherein the rib has the same radial height along an axial direction from a proximal end of the rib to a distal end of the rib.

4. The hood lifting mechanism of claim 2, wherein a radial height of the rib tapers along an axial direction from a distal end of the rib toward a proximal end of the rib.

5. The hood lifting mechanism of claim 2, wherein the rib has a triangular profile as taken in the axial direction.

6. The hood lifting mechanism of claim 2, wherein the rib comprises a plurality of ribs, the ribs being circumferentially spaced apart from each other.

7. The hood lifting mechanism of claim 1, wherein the engagement area and mating surface are non-circular shaped.

8. The hood lifting mechanism of claim 7, wherein the engagement area and mating surface have a rectangular shaped profile as taken in the axial direction.

9. The hood lifting mechanism of claim 1, wherein the piston comprises a proximal end and a distal end, and wherein the engagement area is adjacent the distal end.

10. The hood lifting mechanism of claim 9, wherein the engagement area is a first engagement area, and the piston has a second engagement area adjacent the proximal end.

11. The hood lifting mechanism of claim 1, wherein the distal end of the outer tube comprises a wall that extends radially inwardly from an inner surface of the outer tube, the wall defining the opening.

12. The hood lifting mechanism of claim 1, wherein the housing further comprises an end bracket disposed adjacent the distal end of the outer tube, the opening defined by the distal end of the outer tube is a first opening, and the opening defined by the housing further comprises a second opening defined by the end bracket, wherein the first and second openings are axially aligned, and the mating surface comprises at least a portion of a surface of the second opening.

13. The hood lifting mechanism of claim 1, wherein the housing further comprises an end cap disposed adjacent the distal end of the outer tube, the opening defined by the distal end of the outer tube is a first opening, and the opening defined by the housing further comprises a second opening defined by the end cap, wherein the first and second openings are axially aligned, and the mating surface comprises at least a portion of a surface of the second opening.

14. The hood lifting mechanism of claim 1, wherein the piston comprises a piston rod and a striker, the striker is coupled to a distal end of the piston rod, and at least a portion of an outer radial surface of the striker defines the engagement area.

15. The hood lifting mechanism of claim 14, wherein the striker is threadingly coupled to the distal end of the piston rod.

16. The hood lifting mechanism of claim 14, wherein the striker is integrally formed with the piston rod.

17. The hood lifting mechanism of claim 1, wherein the threshold actuating force is at least about 300 Newtons.

18. The hood lifting mechanism of claim 1, wherein an outer diameter of the engagement area is greater than an inner diameter of the mating surface by between 0.05 mm and 0.4 mm.

* * * * *